Sept. 18, 1951          H. B. MORRIS          2,568,128

BLOWING ARTICLE OF RUBBER, ETC

Filed May 15, 1947                                      2 Sheets-Sheet 1

Inventor
HAROLD B. MORRIS
By Gordon C. Mack
Attorney

Sept. 18, 1951　　　　　H. B. MORRIS　　　　　2,568,128
BLOWING ARTICLE OF RUBBER, ETC
Filed May 15, 1947　　　　　　　　　　2 Sheets-Sheet 2

Inventor
HAROLD B. MORRIS
By Gordon C. Mack
Attorney

Patented Sept. 18, 1951

2,568,128

UNITED STATES PATENT OFFICE 2,568,128

BLOWING ARTICLES OF RUBBER, ETC.

Harold B. Morris, Akron, Ohio, assignor to Eagle Rubber Co., Inc., Ashland, Ohio, a corporation of Delaware Application May 15, 1947, Serial No. 748,265

6 Claims. (Cl. 18—58.7)

This invention relates to the blowing of articles of rubber and other elastomers including the various synthetic rubbers. The invention includes the process and apparatus for carrying it out.

In carrying out the invention, a perforated form is covered with an elastomer, as by dipping the form into a dispersion or solution of the elastomer, and the deposit of the elastomer while still on the form is blown either before or after curing. The perforation is the termination of a passage which extends through the form under the whole of the deposit and preferably from the base of the form, to the portion which first contacts the liquid in a vertical dipping operation. The invention involves blowing the dipped article by passing compressed air or other inflating fluid through the passage. There are two different general applications of the process.

In one application, used for the manufacture of balloons and the like, the dipped article is first cured and then inflated. Inflation eliminates the usual inspection step, because a perforate deposit will not inflate. To detect pin holes and other minor defects the article should be inflated until its surface is at least doubled. By continued blowing the article is stripped from the form. Thus in this process the article is automatically inspected and removed from the dipping form.

The other general application of the process involves the inflation of the article before curing. This application is useful in the manufacture of both thin goods, such as balloons and the like, and thicker goods such as toys, etc. In this application the article is inflated in a green or uncured state, but without permitting it to be separated from the form, and it is cured while inflated. Generally the deposit will be inflated to several times its original area but only slight inflation is all that is required. In a preferred adaptation of this application of the invention, the uncured dipped article is inflated inside of a mold, and the rubber is cured while in contact with the mold and thus takes a permanent set the shape of the inner surface of the mold.

The invention will be further described in connection with the drawings in which—

Fig. 11 illustrates a modification in which the base of the dipped article is held to the mold by a clamp or the like.

Although in the detailed discussion of the invention given herein, the invention will be described more particularly in connection with a dipping operation in which the form is first dipped into a coagulant and then into latex, it is to be understood that the invention is not limited to formation of the deposit of the elastomer by dipping. If the deposit be formed by dipping any of the various commercial types of dipping may be employed, whether or not a coagulant be employed and whether the form be dipped in a dispersion or a solution of the elastomer. The form may be of aluminum, but it is to be understood that the invention is not limited thereto, as glass and porcelain forms and other commercial forms may be used. The forms shown are of simple configuration. More complicated forms may be employed in carrying out the invention. The forms may be of paddle design, or they may be shaped as desired to form a balloon or other article of simple outline, or they may be shaped to form balloons and the like of more intricate designs which represent animals, etc. Although air is mentioned as the inflating medium, other fluids may be used. Thus, the invention is not limited to the details of the illustrations which follow.

Figure 1:
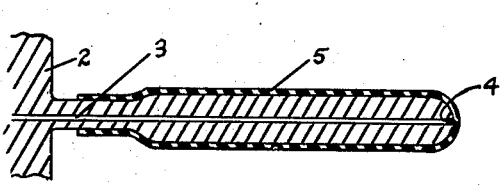
Fig. 1 is a section of a form covered by a deposit of latex formed by dipping.

In Fig. 1 a form 1 which is generally cylindrical in shape is shown mounted on a base 2. This form may be one of many in a bank of forms. These forms may be located close to one another, as is the usual practice at the present time, but they are preferably spaced so that the inflated articles will just touch or will not quite touch one another. If contact of the cured articles on inflation is not detrimental, such spacing is not essential. The line 3 passes from a source of compressed air through the length of the form to the opening 4, which is at the end of the form which first comes into contact with the dipping bath when the forms are dipped vertically.

Although the drawings do not illustrate the layer of coagulant which may be under the dipped film 5, it is understood that in a preferred method of dipping into latex the deposit 5 is formed by dipping the form 1 first in a coagulant and then in a suitably compounded latex. The coagulant may contain talc or other lubricant to prevent adherence of the deposit to the form.

Figure 2:
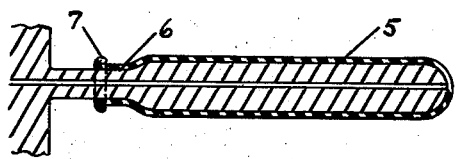
Fig. 2 shows the same after the formation of a bead on the dipped article.

After dipping and obtaining the deposit 5, the narrowed portion 6 of the deposit which is to form the neck of a balloon, is rolled from the base forward as is customary to form the bead or ring 7. This is illustrated in Fig. 2.

After rolling, the balloon is cured. This may be done by passing the form with the deposit on it, through a curing oven, as is common commercial practice. Any method of curing on the form may be employed. If the balloon is to be dried or cured in a high frequency field, the form is made of glass or porcelain or other dielectric.

After curing, the balloon is inflated. At present it is customary to strip the cured balloon from the form and then inflate for inspection by manually placing the balloon over a nozzle which is connected with a source of compressed air. This is a time-consuming operation. By blowing the article while on the form the inspection is automatic. If the deposit is faulty for any reason so that is cannot be inflated, it will remain on the form when the air pressure is turned on. If there is a weak spot in the balloon it will explode when inflated and the remnants of the exploded balloon may be retained on the form but in a deflated condition. Inflation which doubles the area of the balloon will expose most weak spots. Inflation to several times the original size of the balloon will be usual. The degree of inflation will depend upon such factors as the tensile stress of the elastomer, the deposit thickness, the percent the bead or neck of the article, if any, must be stretched to be removed from the form, etc. If there are no imperfections in the balloon, it automatically passes inspection and will be blown from the form. Thus the process includes automatic inspection and stripping from the form.

Figure 3:
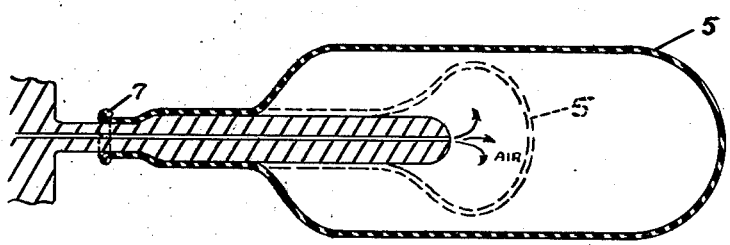
Fig. 3 illustrates the process of inflating the article.
Figure 4:
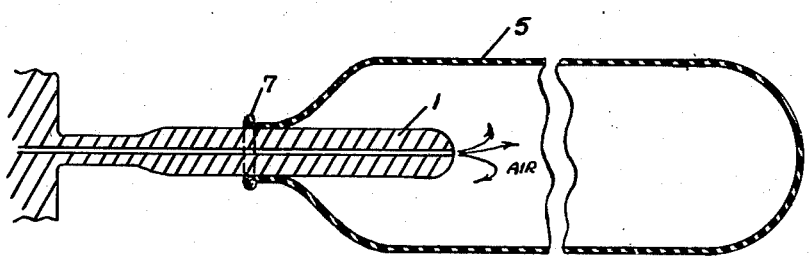
Fig. 4 illustrates the completely inflated article partially removed from the form.
Figure 5:
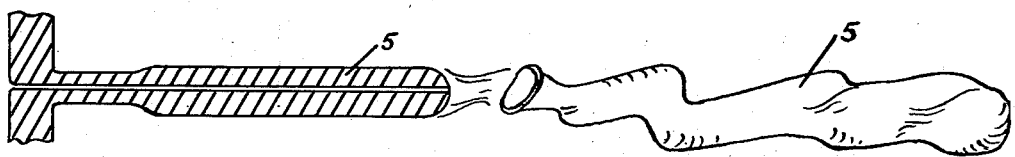
Fig. 5 illustrates how the article is blown from the form.

Fig. 3 illustrates, in dotted lines, how, on inflation, the end of the balloon may first become enlarged. Or the balloon may be lifted a minimal amount from the form and then start to inflate in the center or elsewhere. The inflation continues along the form until the entire balloon to the bead 7 is inflated. After the whole balloon has become inflated to the extent necessary to enlarge the bead 7 so that it embraces the portion of the form of largest diameter, the air pressure will lift the bead from the form sufficiently to allow a thin film of air to pass under the bead, and when this takes place the finished balloon 5 will be ejected from the form as shown in Fig. 4. Immediately after leaving the form, the balloon starts to deflate and Fig. 5 shows it in a partially deflated condition.

Figure 6:
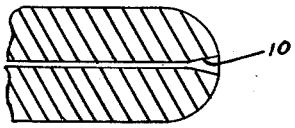
Fig. 6 is a detail showing a preferred form of perforation in the end of the form.

It will be understood that when the form is dipped in coagulant, and later dipped in latex, plugs of the coagulant and/or latex may form in the opening 4. If the portion of the plug which is formed by the latex is of any substantial thickness, it will be apt to become compressed by the pressure of the compressed air against it, and this will enlarge its diameter. Thus, when the air is turned on, the plug will tend to become more tightly wedged in the opening. Fig. 6 shows a preferred form of opening in which the wall 10 of the opening is conical.

In all of the drawings the compressed air passage is enlarged to facilitate illustration. In actual practice the size of the opening 4 or 10 will usually not exceed a small fraction of an inch in diameter, although the form may be as much as a foot or so in length, or it may be a small form not over an inch or two in length.

Figure 8:
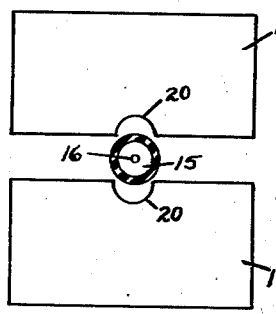
Fig. 8 is an end view of the same with the two halves of the mold separated.
Figure 7:
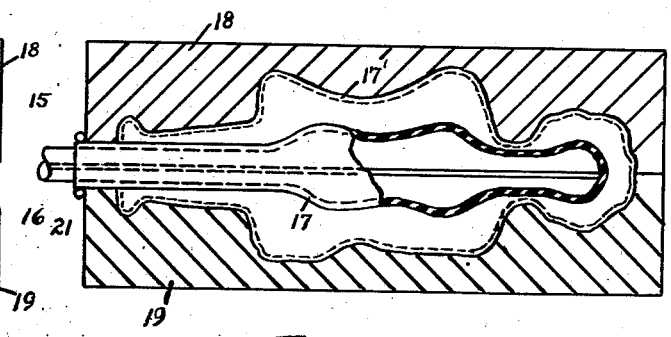
Fig. 7 is a side view of the dipped form enclosed in a mold.
Figure 9:
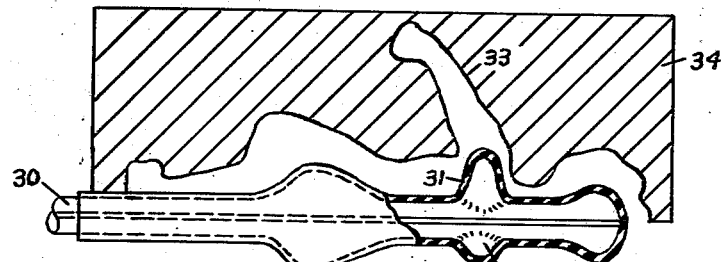
Fig. 9 shows a modified type of form in a mold with a deep cavity.
Figure 10:
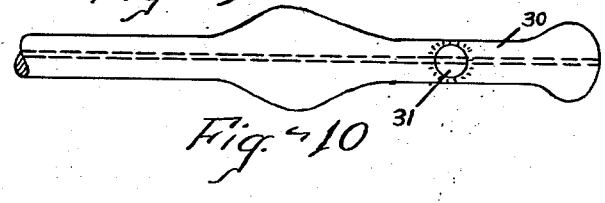
Fig. 10 is a view of the mold at right angles to that shown in Fig. 9.

The deposit may be inflated or stretched before curing and then cured in the inflated or stretched condition. Figs. 7 to 11 illustrate different ways of doing this. In Figs 7 and 8 the form 15 is provided with the compressed air passage 16 which passes through it from the outer end to the source of supply of compressed air. The deposit 17 of elastomer is formed by dipping. The form 15 may be coated with coagulant before dipping, but this is not essential and any process of dipping may be used. Before curing, the two halves 18 and 19 of the mold (which may be provided with vents to facilitate the escape of air during inflation of the elastomer) are brought together over the dipped form and the arced opening 20 at the base of the form is clamped down over the open end of the deposit and holds it firmly in place during the subsequent inflation of the deposit. A bead or ring 21 may be formed at the end of the deposit to assist in holding the deposit in place during inflation. Compressed air is now introduced through the opening 16 and passes the length of the form and inflates the deposit 17 and presses it against the interior of the mold. The reference numeral 17' is used to designate the deposit of elastomer after it has been transferred from the form 15 to the inner surface of the mold 18, 19 where it is shown in dotted lines. It fits snugly against the inner wall of the mold and conforms exactly to it. The form may conform, more or less, to the inner contour of the mold, as illustrated, although this is not essential.

With the deposit inflated against the inner wall of the mold it is heated and cured. It may be cured in any desired manner. The cure is advantageously effected by using a permanently heated mold and inflating articles against the mold one after another and keeping each article in contact with the mold long enough to effect the desired cure. After curing, the two halves of the mold 18 and 19 are separated and the cured product is removed from the form. It may be removed by blowing. The end of the deposit 21 embraced between the arced portions of the end of the mold will then usually be trimmed off as scrap. If the molded object is formed from a thin deposit of latex, or if the latex deposit is sufficiently inflated during cure to form a thin-walled object, the object may thereafter be inflated and deflated, as a balloon, etc. In that case the portion 21 need not be trimmed but may be used as a mouth for inflation. On the other hand, the cured object may be thick-walled and form a non-inflatable toy. The latex will be suitably compounded in either case, and if a thick-walled object is desired, the dipping will be controlled to obtain a thick deposit. Repeated dipping before inflation may be desirable. If the form comprises elongated cavities such as the armholes 30 in the form 31 of Figs. 9 and 10 it may be desirable to use a form 32 with projection 33 and 34 on opposite sides of it, located opposite the armholes in the respective halves of the mold.

As the deposit of latex on the projections is of the same thickness as the deposit over the main body of the form, the projections supply surplus latex under the armholes so that on inflation a thicker covering than would otherwise be possible forms on the wall of the arm indentation. The elastomer will be cured while inflated the same as if operating according to Figs. 7 and 8.

Figure 11:
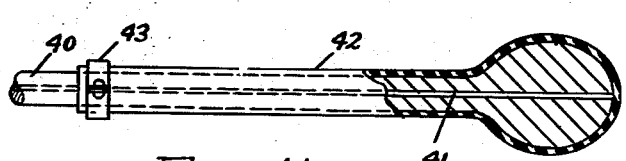

For the molding of objects of simple contour, such as cylindrical objects or spherical balloons, etc., it is not necessary to inflate into a mold. Fig. 11 shows a balloon form 40 provided with a compressed air supply 41. The mold is coated with a deposit of the elastomer 42. The two halves of a clamp 43 are clamped in place around the upper end of the deposit to prevent its displacement during inflation. Deposit 42 will be inflated after the clamp has been closed. The article will be cured while inflated. By measuring the amount of air introduced, the ultimate size of the object is controlled. With a single form, finished articles of different size may be produced. The inflated article may be cured in any suitable manner. Quick curing to prevent any considerable expansion of the contained air is desirable. Inflation with heated air will hasten curing and reduce the amount the film stretches during cure.

There are numerous advantages in molding by this method. Articles may be formed with thinner walls, which means a lower consumption of elastomer; and in the case of balloons, thinner walls mean easier inflation. The wall thickness in any area may be varied by controlling the stretch necessary to fill the restricting cavity. Products of any given size are made on smaller equipment than is required for any usual method of production, permitting the use of smaller forms and smaller dipping tanks, drying ovens, etc., or the production of a larger number of articles in the same sized dipping tanks, drying ovens, etc. Furthermore, the rubber cured under tension has different properties from that cured under normal conditions.

Thus the process may be used for the inspection and removal of balloons and other articles manufactured by curing the elastomer deposit on the form and then inflating, and also for the inflation molding of objects which are then cured in an inflated condition. The process is applicable to dipping in either a solution or dispersion of the elastomer, called in the claims a liquid dilution of the elastomer.

The invention is defined in the appended claims.

What I claim is:

1. The method of preparing an elastomer article which comprises forming a deposit of elastomer on a form by dipping the form into a liquid dilution of the elastomer, and inflating the deposit on said form by introducing inflating medium between the form and the deposit.

2. The method of preparing an elastomer article which comprises forming a layer of elastomer on a form, curing the elastomer, and then inflating it by introducing inflating medium between it and the form and blowing it from the form.

3. The method of preparing an elastomer article which comprises forming a layer of elastomer on a form, inflating the elastomer on the form by introducing inflating medium between the elastomer and the form, curing the elastomer while inflated and before removal from the form.

4. The method of preparing an elastomer article which comprises forming a layer of elastomer on a form, inflating the elastomer on the form by introducing inflating medium between the elastomer and the form while preventing uniform inflation of the elastomer by the inflating medium so that adjoining areas of the elastomer are stretched different amounts, and curing the elastomer while thus inflated.

5. The method of forming an article of an elastomer which comprises heating a molding surface, forming a layer of elastomer on a form, inflating the elastomer by introducing inflating medium between the elastomer and the form thereby inflating the layer of the elastomer into contact with the heated surface and curing it by such contact.

6. The method of preparing an elastomer article which comprises forming a deposit of elastomer on a form by dipping the form into a liquid composition containing the elastomer, and thereafter lifting at least most of the deposit from said form by introducing inflating medium between the deposit and the form.

HAROLD B. MORRIS.

REFERENCES CITED

The following references are of record in the file of this patent:

UNITED STATES PATENTS

| Number | Name | Date |
|---|---|---|
| 1,134,433 | Aylsworth | Apr. 6, 1915 |
| 2,091,364 | Joss | Aug. 31, 1937 |
| 2,119,496 | Spanel | May 31, 1938 |
| 2,217,213 | Bratring | Oct. 8, 1940 |
| 2,248,898 | Ross | July 8, 1941 |
| 2,254,263 | Bratring | Sept. 2, 1941 |
| 2,295,708 | Bitter | Sept. 15, 1942 |
| 2,317,763 | Hall | Apr. 27, 1943 |
| 2,361,583 | Albright | Oct. 31, 1944 |
| 2,378,700 | Habib | June 19, 1945 |
| 2,410,936 | Gronemeyer | Nov. 12, 1946 |